United States Patent
Ito et al.

(10) Patent No.: US 8,804,630 B2
(45) Date of Patent: Aug. 12, 2014

(54) RADIO BASE STATION, MOBILE STATION, AND COMMUNICATION METHOD

(75) Inventors: Akira Ito, Kawasaki (JP); Yoshiaki Ohta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1041 days.

(21) Appl. No.: 12/314,645

(22) Filed: Dec. 15, 2008

(65) Prior Publication Data

US 2009/0270094 A1    Oct. 29, 2009

(30) Foreign Application Priority Data

Apr. 25, 2008 (JP) .................. 2008-114778

(51) Int. Cl.
*H04W 4/00* (2009.01)
(52) U.S. Cl.
USPC .......................... 370/329; 370/331
(58) Field of Classification Search
USPC ................... 370/331, 329
See application file for complete search history.

(56) References Cited

U.S. PATENT DOCUMENTS

| | | | | |
|---|---|---|---|---|
| 8,442,027 | B2 * | 5/2013 | Harada et al. | 370/350 |
| 2006/0209734 | A1 * | 9/2006 | Son et al. | 370/312 |
| 2008/0316961 | A1 * | 12/2008 | Bertrand et al. | 370/329 |
| 2010/0067497 | A1 * | 3/2010 | Chmiel et al. | 370/336 |
| 2010/0260140 | A1 * | 10/2010 | Zhu | 370/331 |
| 2010/0272035 | A1 * | 10/2010 | Park et al. | 370/329 |
| 2012/0044880 | A1 * | 2/2012 | Sun et al. | 370/329 |

FOREIGN PATENT DOCUMENTS

| | | |
|---|---|---|
| WO | 2007139188 A1 | 12/2006 |
| WO | 2007147808 A1 | 12/2007 |
| WO | 2007149509 A2 | 12/2007 |
| WO | 2008024788 A2 | 2/2008 |

OTHER PUBLICATIONS

Chinese First Notification of Office Action dated Sep. 22, 2011 issued in application No. 200910001449.9.
Japanese Patent Office Action issued on Sep. 11, 2012 in Japanese Patent Application No. 2008-114778.
3rd Generation Partnership Project, "Evolved Universal Terrestrial Radio Access (E-UTRA) and Evolved Universal Terrestrial Radio Access Network (E-UTRAN); Overall description; Stage 2 (Release 8)", 3GPP TS 36.300 V8. 4.0; Mar. 2008; pp. 1-126.
Extended European Search Report dated Jun. 20, 2013 received in Application No. 08172621.8.

* cited by examiner

*Primary Examiner* — Shaq Taha
(74) *Attorney, Agent, or Firm* — Smith, Gambrell & Russell, LLP

(57) ABSTRACT

A radio base station improved in the efficiency of processing random accesses from mobile stations. The radio base station designates a random access signal when transmitting downlink data to a mobile station. The mobile station transmits the designated random access signal to the radio base station. The radio base station transmits, to the mobile station, timing adjustment information prepared based on the result of reception of the random access signal and allocation information about an uplink radio resource allocated to the mobile station. If there is control data to be transmitted to the radio base station, the mobile station transmits the control data by using the allocated uplink radio resource, and if there is no control data to be transmitted, the mobile station transmits a synchronization completion report prepared in reply to the timing adjustment information.

14 Claims, 16 Drawing Sheets

| HEADER SECTION | | | | INFO SECTION | | | |
|---|---|---|---|---|---|---|---|
| HEADER #1 | HEADER #2 | ... | HEADER #N | INFO#1 | INFO#2 | ... | INFO#N |

FIG. 9

RADIO BASE STATION, MOBILE STATION, AND COMMUNICATION METHOD

CROSS-REFERENCE TO RELATED APPLICATION(S)

This application is based upon and claims the benefits of priority from the prior Japanese Patent Application No. 2008-114778, filed on Apr. 25, 2008, the entire contents of which are incorporated herein by reference.

BACKGROUND OF THE INVENTION

1. Field of the Invention

The present invention relates to radio base stations, mobile stations, and communication methods.

2. Description of the Related Art

Currently, mobile communication systems enabling wireless communication between a radio base station and a mobile station are widely used. In such mobile communication systems, the radio base station manages radio resources (frequency resource, time resource, etc.) used for the communication from the radio base station to the mobile station (downlink communication) as well as for the communication from the mobile station to the radio base station (uplink communication). The mobile station is allocated an uplink radio resource by the radio base station and performs uplink data transmission or the like by using the allocated uplink radio resource.

In the mobile communication system, part of the uplink radio resource is often assigned to a random access channel in advance. Even while no resource is allocated, the mobile station can transmit a signal (random access signal) via the random access channel. In order to avoid collision of random access signals from multiple mobile stations, the radio base station designates, with respect to each mobile station, a signal (preamble signal) to be sent in the preamble of the random access channel. The following are conceivable uses of the random access channel (see, e.g., 3rd Generation Partnership Project, "Evolved Universal Terrestrial Radio Access (E-UTRA) and Evolved Universal Terrestrial Radio Access Network (E-UTRAN); Overall description; Stage 2 (Release 8)", 3GPP TS36.300, 2008-03 V8.4.0).

Suppose that the radio base station needs to transmit downlink data to a mobile station, by way of example. In this case, first, the radio base station designates a preamble signal that the radio base station permits the mobile station to use. The mobile station transmits the designated preamble signal via the random access channel. The radio base station measures a timing error on the basis of the random access signal received from the mobile station (the preamble signal designated by the radio base station), and instructs the mobile station to adjust the timing. Following the instruction, the mobile station adjusts the transmission timing. Subsequently, the radio base station transmits downlink data to the mobile station. The mobile station then transmits ACK (ACKnowledgement)/NACK (Negative ACKnowledgement), which is indicative of the result of the data reception, to the radio base station at the corrected timing. Thus, at the time of downlink data communication, the random access channel can be used for synchronizing the uplink timing.

Let us now consider the case where the mobile station transmits uplink data to the radio base station. In this case, first, the mobile station selects a preamble signal from among multiple candidates, with the use of random numbers, and transmits the selected preamble signal via the random access channel. On receiving the random access signal (preamble signal not designated by the radio base station) from the mobile station, the radio base station allocates, to the mobile station, an uplink radio resource for transmitting control data. Using the allocated uplink radio resource, the mobile station transmits a data send request (e.g., BSR: Buffer Status Report). The radio base station allocates an uplink radio resource with a size matching the data send request received from the mobile station. Subsequently, the mobile station transmits the uplink data to the radio base station. In this manner, the mobile station can initiate uplink data transmission by using the random access channel.

The random access method described above is, however, associated with the problem that the procedure is executed independently with respect to every cause of the occurrence of a random access, which makes the processing inefficient. Specifically, in the case of a random access at the time of downlink data communication, the allocation of an uplink radio resource is judged to be unnecessary, because only the uplink timing has to be synchronized. Consequently, where the mobile station needs to transmit control data during the downlink data communication (e.g., where the mobile station initiates uplink data communication), the random access procedure must be executed separately for the allocation of an uplink radio resource.

SUMMARY OF THE INVENTION

The present invention was created in view of the above circumstances, and an object thereof is to provide a radio base station, a mobile station and a communication method whereby the efficiency of random access processing can be improved.

To achieve the object, there is provided a radio base station for designating, with respect to a mobile station, a random access signal when transmitting downlink data to the mobile station and for receiving the designated random access signal from the mobile station. The radio base station comprises a transmitter for transmitting, to the mobile station, timing adjustment information prepared based on a result of reception of the random access signal, and allocation information about an uplink radio resource allocated to the mobile station to be used thereby to transmit control data.

Also, to achieve the above object, there is provided a mobile station for accepting designation of a random access signal from a radio base station when receiving downlink data and for transmitting the designated random access signal to the radio base station. The mobile station comprises a receiver for receiving, from the radio base station, timing adjustment information prepared by the radio base station in accordance with a result of reception of the random access signal and allocation information about an uplink radio resource allocated to the mobile station, and a transmitter for transmitting control data to the radio base station by using the uplink radio resource specified by the allocation information received by the receiver.

Further, to achieve the above object, there is provided a communication method comprising the step, executed by a radio base station, of designating, with respect to a mobile station, a random access signal when transmitting downlink data to the mobile station, the step, executed by the mobile station, of transmitting the designated random access signal to the radio base station, and the step, executed by the radio base station, of transmitting, to the mobile station, timing adjustment information prepared based on a result of reception of the random access signal and allocation information about an uplink radio resource allocated to the mobile station to be used thereby to transmit control data.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 9 illustrates a structure of data transmitted subsequently to a random access (RA) response.

DESCRIPTION OF THE PREFERRED EMBODIMENTS

Figure 1:
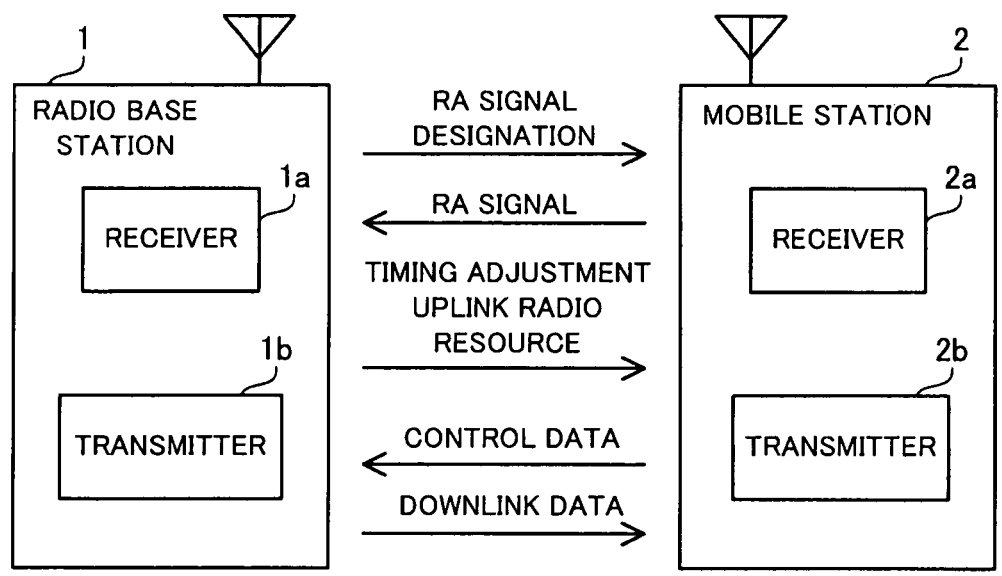
FIG. 1 schematically illustrates a wireless communication system.

Preferred embodiments of the present invention will be described below with reference to the accompanying drawings, wherein like reference numerals refer to like elements throughout.

FIG. 1 schematically illustrates a wireless communication system. The wireless communication system comprises a radio base station 1 and a mobile station 2. Wireless communication can be performed between the radio base station 1 and the mobile station 2 in a down direction (from the radio base station 1 to the mobile station 2) as well as in an up direction (from the mobile station 2 to the radio base station 1).

The radio base station 1 includes a receiver 1a and a transmitter 1b. The receiver 1a receives various data including control data from the mobile station 2 via an uplink data channel or an uplink control channel. Also, the receiver 1a receives a random access (RA) signal via a random access channel. The transmitter 1b transmits various data including control data to the mobile station 2 via a downlink data channel or a downlink control channel.

The mobile station 2 includes a receiver 2a and a transmitter 2b. The receiver 2a receives various data including control data from the radio base station 1 via the downlink data or control channel. The transmitter 2b transmits various data including control data to the radio base station 1 via the uplink data or control channel. Also, the transmitter 2b transmits the random access signal to the radio base station 1 via the random access channel.

When the radio base station 1 communicates downlink data to the mobile station 2, first, the transmitter 1b transmits, to the mobile station 2, designation information designating a random access signal that the radio base station 1 permits the mobile station 2 to use. The designation information includes, for example, a number specifying a type of preamble signal. The transmitter 2b of the mobile station 2 transmits the designated random access signal to the radio base station 1.

Based on the random access signal (e.g., preamble signal) received by the receiver 1a, the radio base station 1 measures an error in uplink communication timing. Also, the radio base station 1 allocates an uplink radio resource to the mobile station 2. The uplink radio resource to be allocated on reception of the random access signal may be of a predetermined size (uniform resource amount) irrespective of the cause of the occurrence of the random access. Subsequently, the transmitter 1b of the radio base station 1 transmits, to the mobile station 2, timing adjustment information and allocation information about the allocated uplink radio resource, as a response to the random access signal.

The mobile station 2 corrects the uplink transmission timing in accordance with the timing adjustment information received by the receiver 2a. Then, using the allocated uplink radio resource, the transmitter 2b of the mobile station 2 transmits control data. The control data to be transmitted may be a synchronization completion report, a data send request (e.g., BSR), or an RRC (Radio Resource Control) message about connection control, for example.

The synchronization completion report may be omitted if there is some other control data that needs to be transmitted. Also, multiple types of control data may be simultaneously transmitted on condition that the size of the allocated uplink radio resource permits. If, on the other hand, the amount of the control data to be transmitted exceeds the allocated size, part of the control data and information about the remaining data amount may be transmitted.

Subsequently, the transmitter 1b of the radio base station 1 transmits the downlink data to the mobile station 2. At the time when the control data (synchronization completion report or a different type of control data transmitted in lieu of the synchronization completion report) is received by the receiver 1a, the radio base station 1 can ascertain that the timing has been synchronized with the mobile station 2. Also, where the data send request or the information about the remaining data amount is received by the receiver 1a as the control data, the radio base station 1 allocates the mobile station 2 an additional uplink radio resource with a size matching the content of the received control data.

With the wireless communication system described above, when downlink data is to be transmitted from the radio base station 1 to the mobile station 2, the transmitter 1b of the radio base station 1 transmits, to the mobile station 2, the designation information designating a random access signal. The transmitter 2b of the mobile station 2 transmits the designated random access signal to the radio base station 1. Then, the transmitter 1b of the radio base station 1 transmits, to the mobile station 2, the timing adjustment information prepared on the basis of the result of the reception of the random access signal, as well as the allocation information about the uplink radio resource allocated to mobile station to be used thereby to transmit control data.

As a result, the efficiency of random access processing improves. Namely, also in the case of a random access performed for the purpose of timing synchronization at the time of downlink data communication, the mobile station 2 is allocated an uplink radio resource. Thus, when the mobile station 2 has to perform both downlink data communication and transmission of control data, the mobile station 2 can use the uplink radio resource allocated thereto and need not make a separate random access. Also, after receiving a random access response including the timing adjustment information, the mobile station 2 transmits a certain type of control data to the radio base station 1, and this enables the radio base station 1 to recognize at an early stage that the timing synchronization has succeeded.

In the following, the embodiment will be described in detail.

Figure 2:
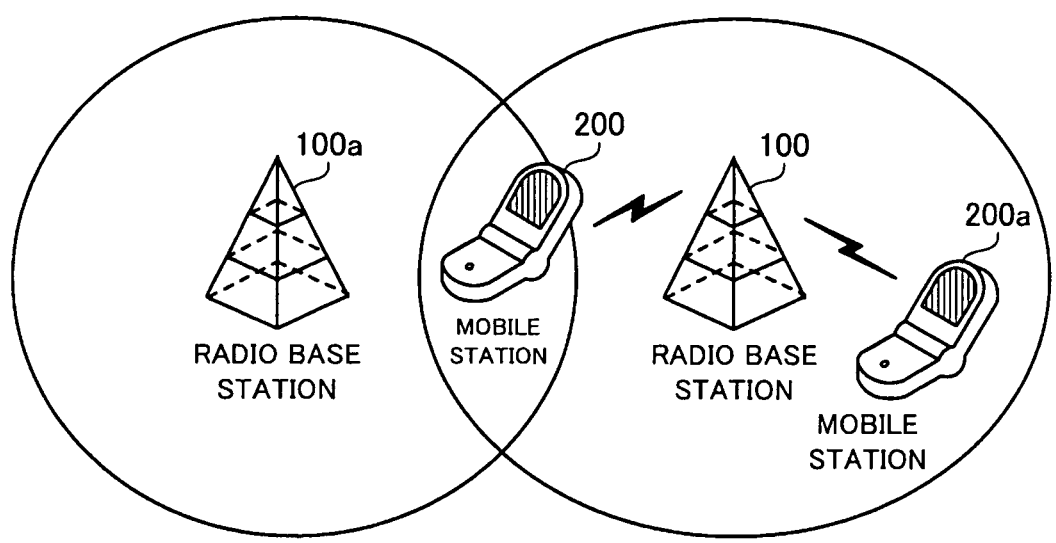
FIG. 2 illustrates a system configuration of the wireless communication system.

FIG. 2 illustrates a system configuration of a wireless communication system. The wireless communication system illustrated in FIG. 2 comprises radio base stations 100 and 100a and mobile stations 200 and 200a.

The radio base stations 100 and 100a are wireless communication devices capable of communicating with wireless terminal devices located in their respective radio wave coverage areas. The radio base stations 100 and 100a can communicate with each other via a host station, not illustrated. The mobile stations 200 and 200a are wireless terminal devices capable of communicating with the radio base station 100, 100a and each comprises, for example, a mobile phone.

The radio base station 100, 100a and the mobile station 200, 200a are capable of two-way communications (uplink communication and downlink communication). Radio resources used for the wireless communications are managed by the radio base station 100, 100a. Namely, the mobile station 200, 200a is allocated an uplink radio resource by the radio base station 100, 100a, whereupon the mobile station can transmit uplink data.

Figure 3:
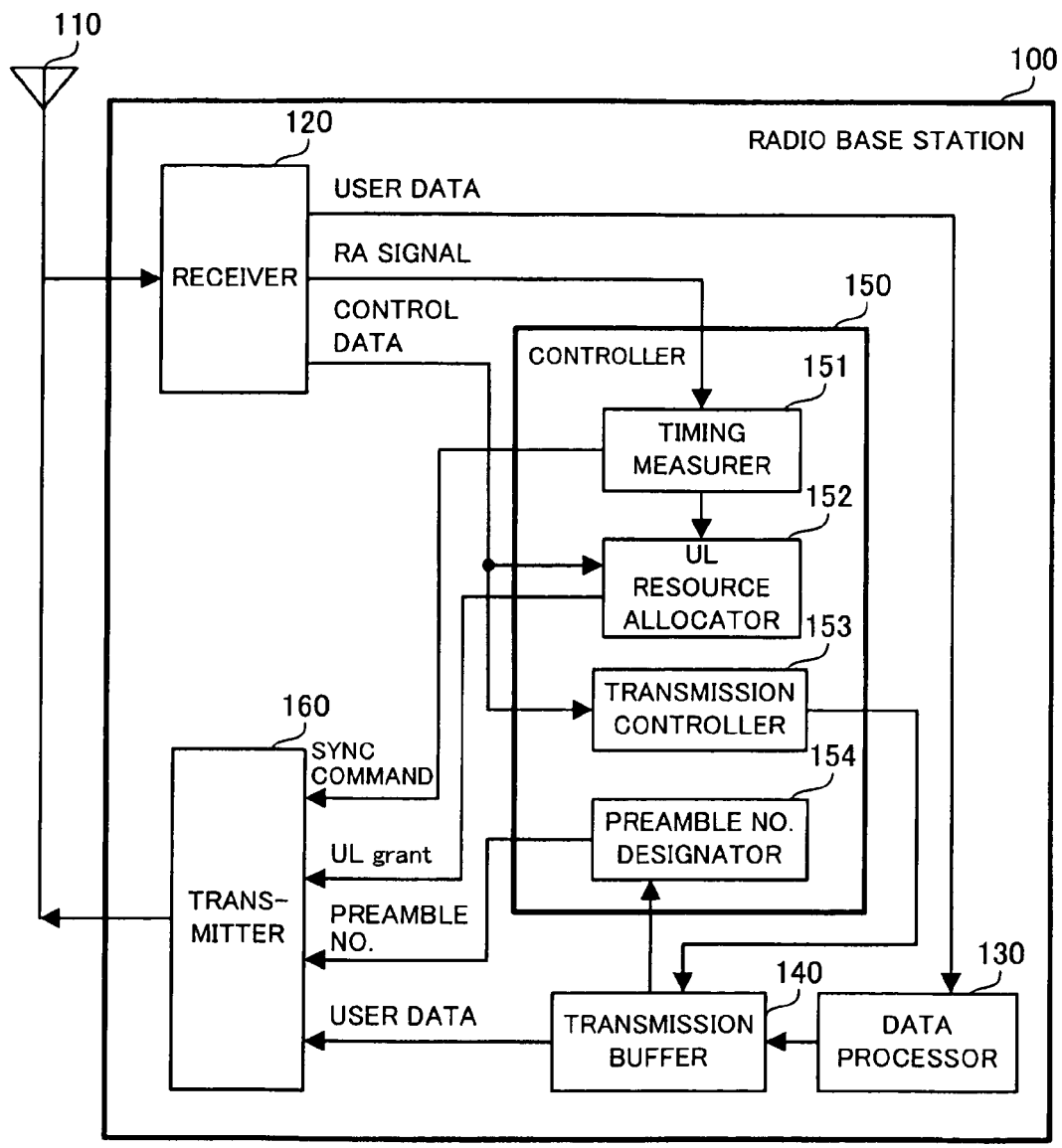
FIG. 3 is a block diagram of a radio base station.

FIG. 3 is a block diagram of the radio base station. The radio base station 100 comprises an antenna 110, a receiver 120, a data processor 130, a transmission buffer 140, a controller 150, and a transmitter 160. The radio base station 100a is configured in the same manner as the radio base station 100.

The antenna 110 is used for both transmission and reception. The antenna 110 receives radio signals from the mobile station 200, 200a and outputs the received signals to the receiver 120. Also, the antenna 110 receives transmit signals from the transmitter 160 and outputs the received signals as radio signals. A transmitting antenna and a receiving antenna may be provided separately.

The receiver 120 demodulates/decodes the received signal supplied from the antenna 110, to extract user data (e.g., voice data, electronic mail data, image data, etc.) contained in the uplink data channel as well as control data contained in the uplink data or control channel. Also, the receiver 120 extracts a signal (random access signal) from the random access channel. Then, the receiver 120 outputs the extracted user data to the data processor 130. The extracted control data and the random access signal are output to the controller 150.

The data processor 130 processes the user data supplied from the receiver 120, as well as user data supplied from other radio base stations via the host station. For example, the data processor 130 processes the received user data according to the data type. Then, the data processor 130 outputs, to the transmission buffer 140, user data to be transmitted to mobile stations that exist in the radio wave coverage area of the radio base station 100.

The transmission buffer 140 is a buffer memory for temporarily holding user data. Specifically, the transmission buffer 140 holds the user data supplied from the data processor 130. Also, in accordance with the instructions from the controller 150, the transmission buffer 140 outputs the user data to the transmitter 160. The transmission buffer 140 may store the user data in such a manner that the user data is classified according to destinations and data types, and the user data with a specific destination or of a specific type instructed from the controller 150 may be preferentially output.

The controller 150 controls the wireless communication process of the radio base station 100. The controller 150 includes a timing measurer 151, an uplink (UL) resource allocator 152, a transmission controller 153, and a preamble number designator 154.

The timing measurer 151 measures, based on the random access signal supplied from the receiver 120, a difference, or an error, between the reception timing that the radio base station 100 expects to be and the actual reception timing of the signal from the mobile station 200, 200a. For the timing measurement, the signal in the preamble (preamble signal) may be used. Subsequently, the timing measurer 151 generates a synchronization (sync) command for timing correction and outputs the generated command to the transmitter 160. Also, the timing measurer 151 notifies the uplink resource allocator 152 of the reception of the random access signal.

On receiving the notification from the timing measurer 151 that the random access signal has been received, the uplink resource allocator 152 allocates, to the source of the random access signal, a predetermined size of uplink radio resource as the uplink data channel. The size of the uplink radio resource to be allocated on reception of the random access signal may be equal, for example, to the data amount of the BSR or thereabout.

Also, when the control data is received from the receiver 120, the uplink resource allocator 152 allocates, to the source of the control data, an uplink radio resource with a size matching the content of the control data. After allocating the uplink radio resource, the uplink resource allocator 152 generates allocation information (UL grant) and outputs the generated information to the transmitter 160. The allocation information includes the allocated size (e.g., the number of allocated bits or blocks).

After a response to the random access (random access response) is sent out, the transmission controller 153 acquires control data from the mobile station 200, 200a and then instructs the transmission buffer 140 to output the user data destined for the mobile station 200, 200a. The control data acquired at this time can be a synchronization completion report, or a BSR or RRC message transmitted in lieu of the synchronization completion report, for example.

The preamble number designator 154 monitors the arrival of user data at the transmission buffer 140. On arrival of the user data destined for the mobile station 200, 200a, the preamble number designator 154 designates a preamble to be used by the mobile station 200, 200a from among multiple candidates prepared beforehand. Once a preamble is designated, the use of the designated preamble by other mobile stations is prohibited thereafter for a predetermined time. The preamble number designator 154 then outputs the preamble number indicative of the designated preamble to the transmitter 160.

The transmitter 160 encodes/modulates the user data supplied from the transmission buffer 140 as well as the various control data (synchronization command, allocation information, preamble number, etc.) supplied from the controller 150, to generate transmit signals to be sent via the downlink data and control channels. Subsequently, the transmitter 160 outputs the generated transmit signals to the antenna 110.

Figure 4:
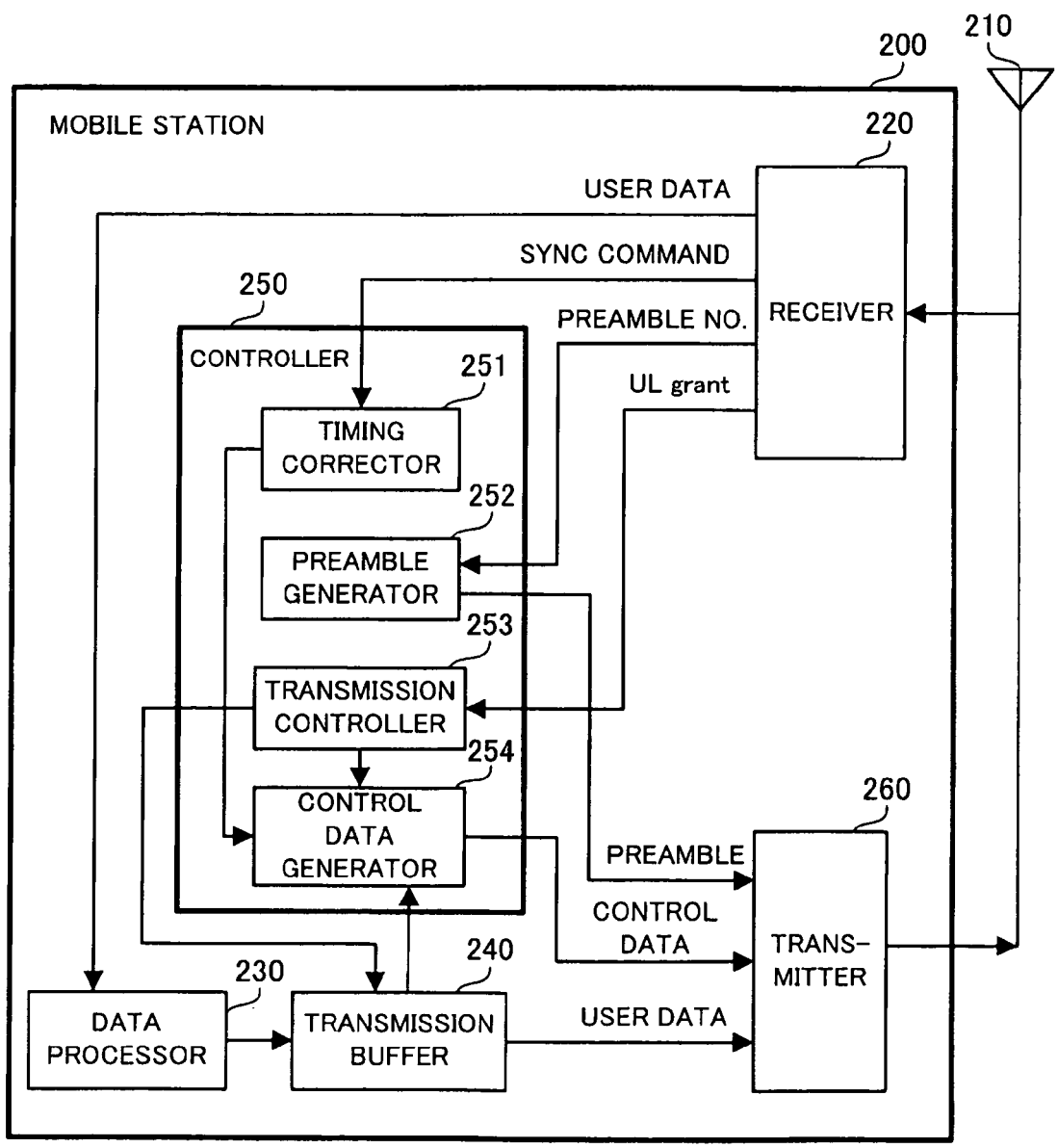
FIG. 4 is a block diagram of a mobile station.

FIG. 4 is a block diagram of the mobile station. The mobile station 200 comprises an antenna 210, a receiver 220, a data processor 230, a transmission buffer 240, a controller 250, and a transmitter 260. The mobile station 200a is configured in the same manner as the mobile station 200.

The antenna 210 is used for both transmission and reception. The antenna 210 receives radio signals from the radio base station 100, 100a and outputs the received signals to the receiver 220. Also, the antenna 210 receives transmit signals from the transmitter 260 and outputs the received signals as radio signals. A transmitting antenna and a receiving antenna may be provided separately.

The receiver 220 demodulates/decodes the received signal supplied from the antenna 210, to extract the user data contained in the downlink data channel as well as the control data contained in the downlink data or control channel. The receiver 220 outputs the extracted user data to the data processor 230. The extracted control data is output to the controller 250.

The data processor 230 processes the user data supplied from the receiver 220 in accordance with the data type. For example, the data processor 230 performs the process of displaying text or images or the process of reproducing voice. Also, the data processor 230 generates user data to be transmitted to the radio base station 100 and outputs the generated data to the transmission buffer 240.

The transmission buffer 240 is a buffer memory for temporarily holding user data. Specifically, the transmission buffer 240 holds the user data supplied from the data processor 230. Also, the transmission buffer 240 outputs, to the transmitter 260, an amount of the user data instructed by the controller 250.

The controller 250 controls the wireless communication process of the mobile station 200. The controller 250 includes a timing corrector 251, a preamble generator 252, a transmission controller 253, and a control data generator 254.

When a synchronization command is received as the control data from the receiver 220, the timing corrector 251 corrects the uplink transmission timing in accordance with the synchronization command. Subsequently, the timing corrector 251 notifies the control data generator 254 that the timing correction has been completed.

Where a preamble number is received as the control data from the receiver 220, the preamble generator 252 generates a preamble signal sequence specified by the preamble number, and outputs the generated sequence to the transmitter 260. Such a designated, individual preamble signal is generated, for example, at the start of downlink data communication or at the time of handover.

Also, in cases where control data needs to be transmitted with no preamble number designated, the preamble generator 252 selects a preamble number with the use of random numbers, and generates a preamble signal corresponding to the selected preamble number. Such a non-designated, non-individual preamble signal is generated, for example, at the time of initial connection following power activation, at the time of reconnection after a connection break, or at the start of uplink data transmission.

As for the correspondence relationship between the preamble numbers and the respective types of preamble signal, agreement is reached in advance between the preamble generator 252 and the radio base station 100, 100a. The correspondence relationship may be a fixed relationship, or information about the correspondence relationship may be acquired from the radio base station 100, 100a at the start of communication. Also, the correspondence relationship may differ from one radio base station to another.

The transmission controller 253 controls the transmission of the user data and control data in accordance with the uplink radio resource allocation information (UL grant) received as the control data from the receiver 220. When transmitting the user data, the transmission controller 253 notifies the transmission buffer 240 of the amount of user data that can be transmitted. On the other hand, when transmitting the control data, the transmission controller notifies the control data generator 254 of the amount of control data that can be transmitted.

The control data generator 254 generates various control data and, in accordance with the notification from the transmission controller 253, outputs the generated control data to the transmitter 260. For example, the control data generator 254 monitors the arrival of user data at the transmission buffer 240 and generates a BSR indicating the amount of the user data. Also, the control data generator 254 generates an RRC message at the time of initial connection or reconnection with the radio base station 100, 100a or at the time of handover. Further, when data is received from the radio base station 100, 100a, the control data generator 254 generates ACK or NACK.

Moreover, when the notification of completion of the timing correction is received from the timing corrector 251 and if there is no particular control data to be transmitted, the control data generator 254 generates a synchronization completion report. Where the size of the allocated uplink radio resource is smaller than the amount of the control data to be transmitted, on the other hand, the control data generator 254 outputs part of the transmit control data to the transmitter 260, then generates control data indicating the remaining data amount, and outputs the generated control data to the transmitter 260.

The transmitter 260 encodes/modulates the user data supplied from the transmission buffer 240 as well as the control data supplied from the controller 250, to generate transmit signals to be sent via the uplink data and control channels. Also, the transmitter 260 sets the preamble supplied from the controller 250, as a signal to be sent via the preamble of the random access channel. The transmitter 260 then outputs the obtained transmit signal to the antenna 210.

Figure 5:
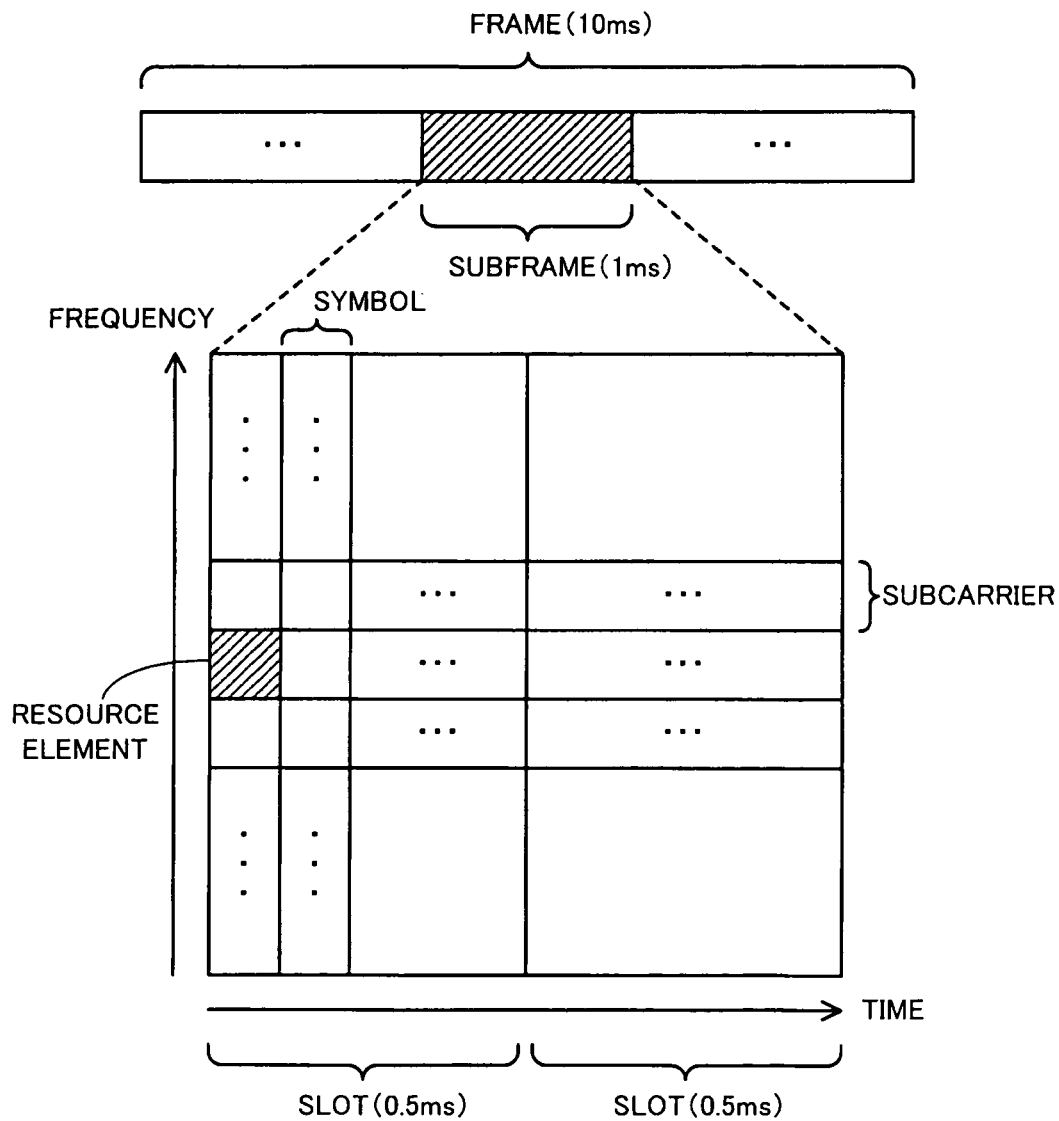
FIG. 5 illustrates a radio frame structure.

FIG. 5 illustrates a radio frame structure. In this embodiment, OFDM (Orthogonal Frequency Division Multiplexing) or SC-FDM (Single Carrier-Frequency Division Multiplexing) can be adopted as a multiplex communication scheme. A radio frame illustrated in FIG. 5, by way of example, is exchanged between the radio base station 100, 100a and the mobile station 200, 200a. In the illustrated example, one frame has a time width of 10 ms (milliseconds) and contains a plurality of subframes. The time width of one subframe is 1 ms.

Each subframe, which is expressed as frequency resource× time resource, is segmented for the purpose of management. The smallest unit in the direction of the frequency axis is called subcarrier, and the smallest unit in the direction of the time axis is called symbol. The minimum unit specified by one subcarrier and one symbol is referred to as resource element. Radio resources are allocated by the unit called resource block spanning multiple subcarriers (e.g., 12 subcarriers). In the 1-ms time width of each subframe, the first and second halves, 0.5 ms each, are individually called slot.

Segments of the radio resources are used respectively as the downlink data channel (PDSCH: Physical Downlink Shared CHannel), the downlink control channel (PDCCH: Physical Downlink Control CHannel), the uplink data channel (PUSCH: Physical Uplink Shared CHannel), the uplink control channel (PUCCH: Physical Uplink Control CHannel), and the random access channel (RACH: Random Access CHannel).

Figure 6:
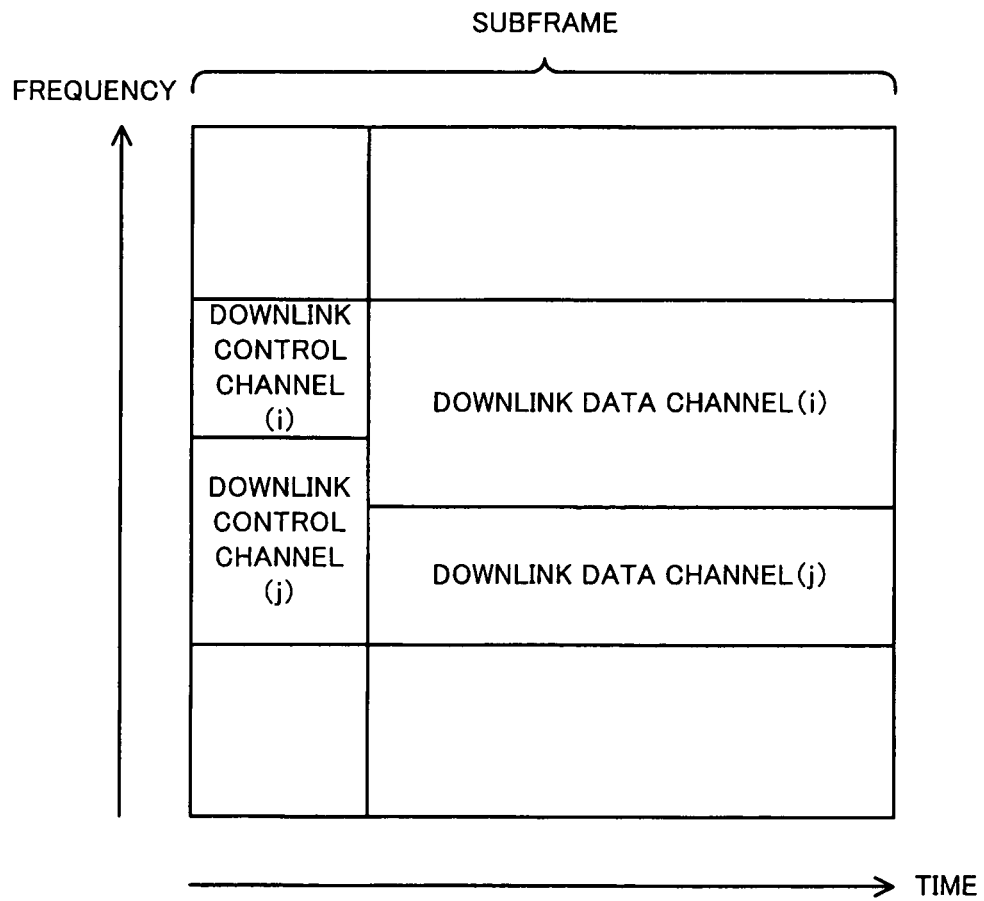
FIG. 6 illustrates a downlink communication channel.

FIG. 6 illustrates a downlink communication channel. During the downlink communication from the radio base station 100, 100a to the mobile station 200, 200a, the communication channel illustrated in FIG. 6, for example, is formed in each subframe. The downlink communication channel includes downlink control channels and downlink data channels.

For each downlink control channel, a predetermined symbol length (e.g., one to three symbols) of the radio resources from the beginning of the subframe is allocated. Also, multiple downlink control channels are multiplexed in terms of frequency. The radio base station 100, 100a notifies in advance the mobile station 200, 200a of downlink control channels that may possibly be used for the transmission of the control data to the local mobile station. The mobile station 200, 200a monitors the notified downlink control channels to detect the control data destined therefor. The downlink control channels are used to convey various control data (e.g., location information about the location of the downlink data channel carrying data for the mobile station 200, 200a, uplink radio resource allocation information, etc.).

Segments of the radio resources other than those used for the downlink control channels are allocated to the downlink data channels. Also, multiple downlink data channels are multiplexed in terms of frequency. Further, the downlink data channels are multiplexed with the downlink control channels in terms of time. The size of radio resource used for each downlink data channel is variable. Based on the control data acquired via the downlink control channel, the mobile station 200, 200a identifies the downlink data channel carrying data destined therefor. The downlink data channel is used to convey the user data and part of the control data (e.g., random access response).

Figure 7:
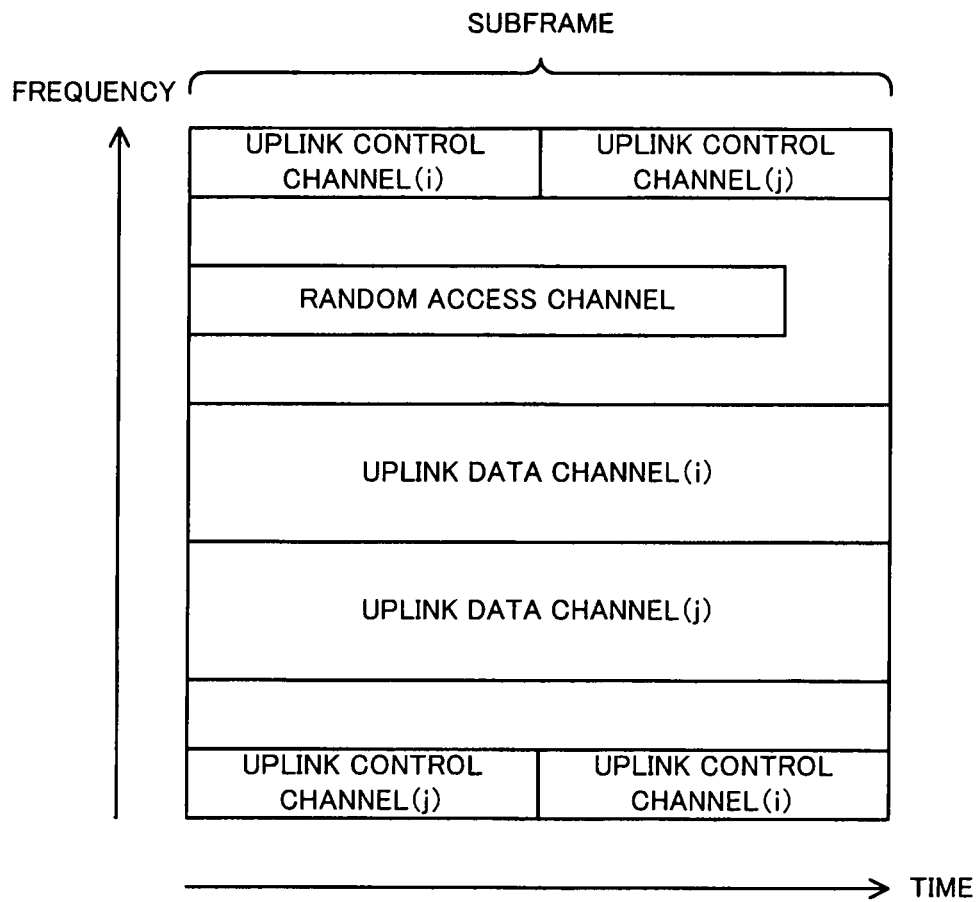
FIG. 7 illustrates an uplink communication channel.

FIG. 7 illustrates an uplink communication channel. During the uplink communication from the mobile station 200, 200a to the radio base station 100, 100a, the communication channel illustrated in FIG. 7, for example, is formed in each subframe. The uplink communication channel includes uplink control channels, uplink data channels, and the random access channel.

Predetermined frequency ranges of the radio resources from the lowest and highest frequencies of the whole frequency band (system bandwidth) available to the radio base station 100, 100a are allocated to the uplink control channels. Each uplink subframe includes two control channels. For the first control channel (uplink control channel i), the high-frequency range of the first-half slot and the low-frequency range of the second-half slot are allocated, and for the second control channel (uplink control channel j), the low-frequency range of the first-half slot and the high-frequency range of the second-half slot are allocated.

In each uplink control channel, data from multiple mobile stations is code-division multiplexed for transmission. Using one of the uplink control channels i and j, the mobile station 200, 200a can transmit a predetermined type of control data such as ACK/NACK. Where an uplink data channel has already been allocated, however, the mobile station 200, 200a uses the uplink data channel, instead of the uplink control channel. Also, in cases where there are many mobile stations located inside the coverage of the radio base station 100, 100a, a separate uplink control channel can be created within each of the uplink control channels i and j.

The uplink data channels are assigned segments of the frequency band other than those used for the uplink control channels. The multiple uplink data channels are multiplexed in terms of frequency. Based on the allocation information received via the downlink control channel, the mobile station 200, 200a identifies the uplink data channel allocated thereto. The uplink data channel is used to convey the user data and various control data (e.g., BSR, RRC message, ACK/NACK, etc.).

The random access channel is assigned a segment of the frequency band other than those used for the uplink control channels. Not every subframe includes the random access channel; for example, one frame includes at least one random access channel. Agreement is reached in advance between the radio base station 100, 100a and the mobile station 200, 200a about the location of the random access channel.

The random access channel is used to convey random access signals including preambles. Where the preamble signals received via the same random access channel are of different types (different preamble numbers), the radio base station 100, 100a can identify the individual signals as respective different signals. If the received preamble signals are of the same type, on the other hand, the radio base station is unable to identify the individual random access signals. In this case, the random access ends in failure.

Figure 8:
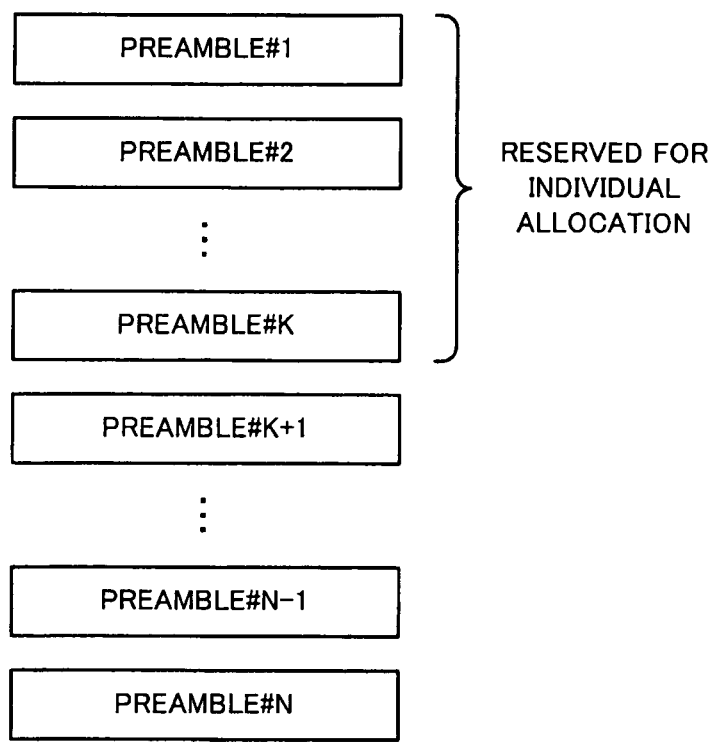
FIG. 8 illustrates different types of preamble signal.

FIG. 8 illustrates the types of preamble signal. The radio base station 100, 100a has prepared therein first to Nth ($1<N$), namely, N types of preamble signal sequence as preambles. Among these, the first to Kth ($1<K<N$) preambles are reserved for individual allocation. The (K+1)th to Nth preambles, which are not reserved for individual allocation, are available to the mobile station 200, 200a.

Namely, the use of the first to Kth preambles is managed by the radio base station 100, 100a. Accordingly, where these preambles are used, collision of random accesses can be prevented. On the other hand, the (K+1)th to Nth preambles are not managed by the radio base station 100, 100a and are used by the mobile station 200, 200a at their discretion. Thus, where these preambles are used, there is a possibility that random accesses will collide and fail as a result. The preambles reserved for individual allocation need not necessarily be assigned small numbers as illustrated in FIG. 8, and preambles with desired numbers may be selected as such preambles.

FIG. 9 illustrates the structure of data transmitted after reception of a random access response. When a random access response is received from the radio base station 100, 100a, the mobile station 200, 200a transmits control data in the format illustrated in FIG. 9, for example. The format comprises a header section and an information section. The header section includes an identifier (Logical Channel ID) indicating the type of control data, and the information section includes the contents of the control data.

In the case of transmitting multiple items of control data at a time, the header and information sections each include multiple fields. In the example illustrated in FIG. 9, header #1 is correlated with information #1, header #2 with information #2, and header #N with information #N. For example, the mobile station 200, 200a can send an identifier identifying control data indicative of a remaining data amount, as the header #N, and send a numerical value indicative of the remaining data amount (e.g., number of bits), as the information #N. The radio base station 100, 100a looks up the header section to identify the respective types of the received control data, whereby processes matching the control data types can be executed.

The following describes details of processes executed by the wireless communication system described above.

Figure 10:
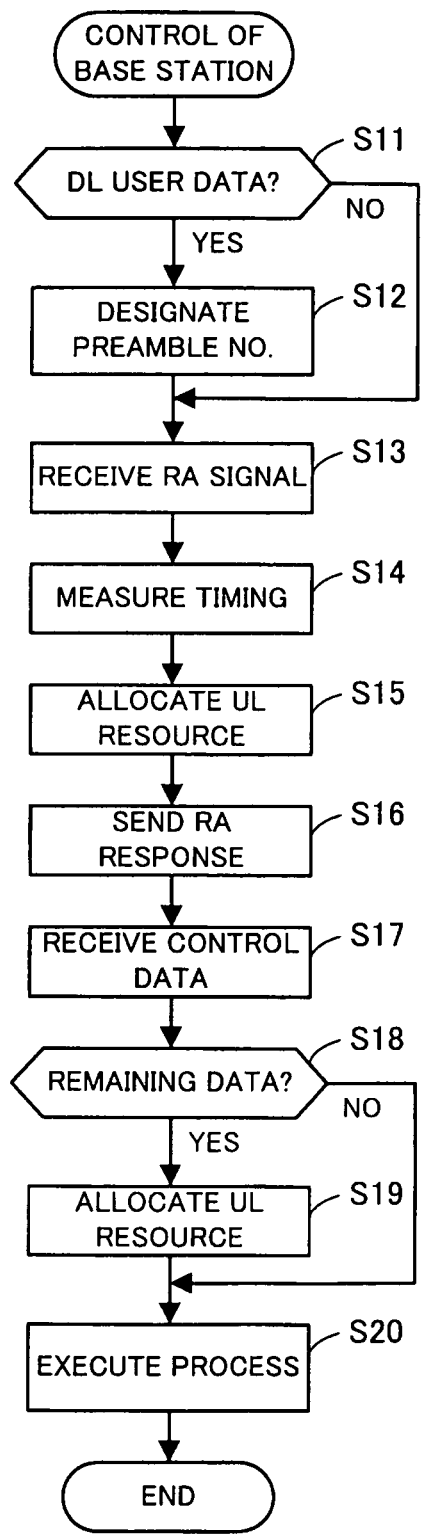
FIG. 10 is a flowchart illustrating a random access control process executed by the radio base station.

FIG. 10 is a flowchart illustrating a random access control process executed by the radio base station, wherein it is assumed that wireless communication is performed between the radio base station 100 and the mobile station 200. In the following, the process illustrated in FIG. 10 will be explained in order of step number.

Step S11: The preamble number designator 154 determines whether or not there is any downlink (DL) user data to be transmitted to the mobile station 200. If there is user data to be transmitted, the process proceeds to Step S12; if not, the process proceeds to Step S13.

Step S12: The preamble number designator 154 selects a preamble that is not yet allocated to other mobile stations such as the mobile station 200a, from among those reserved for the individual allocation, and allocates the selected preamble to the mobile station 200. The transmitter 160 transmits the corresponding preamble number to the mobile station 200 via the downlink data channel.

Step S13: The receiver 120 receives the random access signal including the preamble designated in Step S12 or the preamble selected by the mobile station 200, from the mobile station 200 via the random access channel.

Step S14: Based on the preamble of the random access signal received in Step S13, the timing measurer 151 measures an error between the expected reception timing and the actual reception timing. Then, the timing measurer 151 generates a synchronization command for correcting the transmission timing.

Step S15: The uplink resource allocator 152 allocates an uplink radio resource with a fixed size (e.g., size equivalent to the BSR data amount) that is independent of the cause of the occurrence of a random access, to the mobile station 200 as the uplink data channel. Then, the uplink resource allocator 152 generates allocation information indicative of the allocated uplink radio resource.

Step S16: The transmitter 160 transmits a random access response including the synchronization command generated in Step S14 and the allocation information generated in Step S15, to the mobile station 200 via the downlink data channel.

Step S17: The receiver 120 receives control data from the mobile station 200 via the uplink radio resource (uplink data channel) allocated in Step S15. The control data received at this time can be a synchronization completion report, BSR, RRC message, or information on the remaining data amount, for example. Multiple items of control data are received as the case may be.

Step S18: The uplink resource allocator 152 determines whether or not the control data received in Step S17 includes information about the remaining data amount. This determination is made, for example, by checking the identifiers included in the header section of the received data. If information on the remaining data amount is included, the process proceeds to Step S19; if not, the process proceeds to Step S20.

Step S19: The uplink resource allocator 152 allocates the mobile station 200 an uplink radio resource with a size matching the remaining data amount, as the uplink data channel. Then, the uplink resource allocator 152 generates allocation information about the allocated uplink radio resource. The transmitter 160 transmits the generated allocation information to the mobile station 200 via the downlink control channel.

Step S20: The controller 150 executes a control process in accordance with the control data received in Step S17. For example, where a BSR has been received, an uplink radio resource with a size matching the BSR is allocated to the mobile station 200 as the uplink data channel. Where an RRC message has been received, on the other hand, initial connection or reconnection or the connection control for handover is executed in accordance with the content of the RRC message. Also, where the decision has been made in Step S11 that there is user data to be transmitted, the transmitter 160 transmits the user data to the mobile station 200 via the downlink data channel.

In this manner, when a preamble signal is received via the random access channel, the radio base station 100 allocates the mobile station 200 an uplink radio resource with the predetermined size that is independent of the cause of the occurrence of a random access. Then, the radio base station transmits a random access response including the allocation information to the mobile station 200. The radio base station 100 thereafter receives control data via the allocated uplink radio resource and executes a process in accordance with the received control data. If, in this case, there is remaining control data not received yet from the mobile station 200, the radio base station allocates an additional uplink radio resource.

In the process described above, the timing measurement in Step S14 and the resource allocation in Step S15 may be executed in reverse order. Also, in the above description, the allocation information is included in the random access response to be transmitted together therewith. Alternatively, the allocation information may be transmitted separately at different timing from the random access response. Further, in the foregoing, the preamble number and the random access response are transmitted via the downlink data channel but may alternatively be transmitted via the downlink control channel. Likewise, in the above description, the allocation information other than the one included in the random access response is transmitted via the downlink control channel but may alternatively be transmitted via the downlink data channel.

Figure 11:
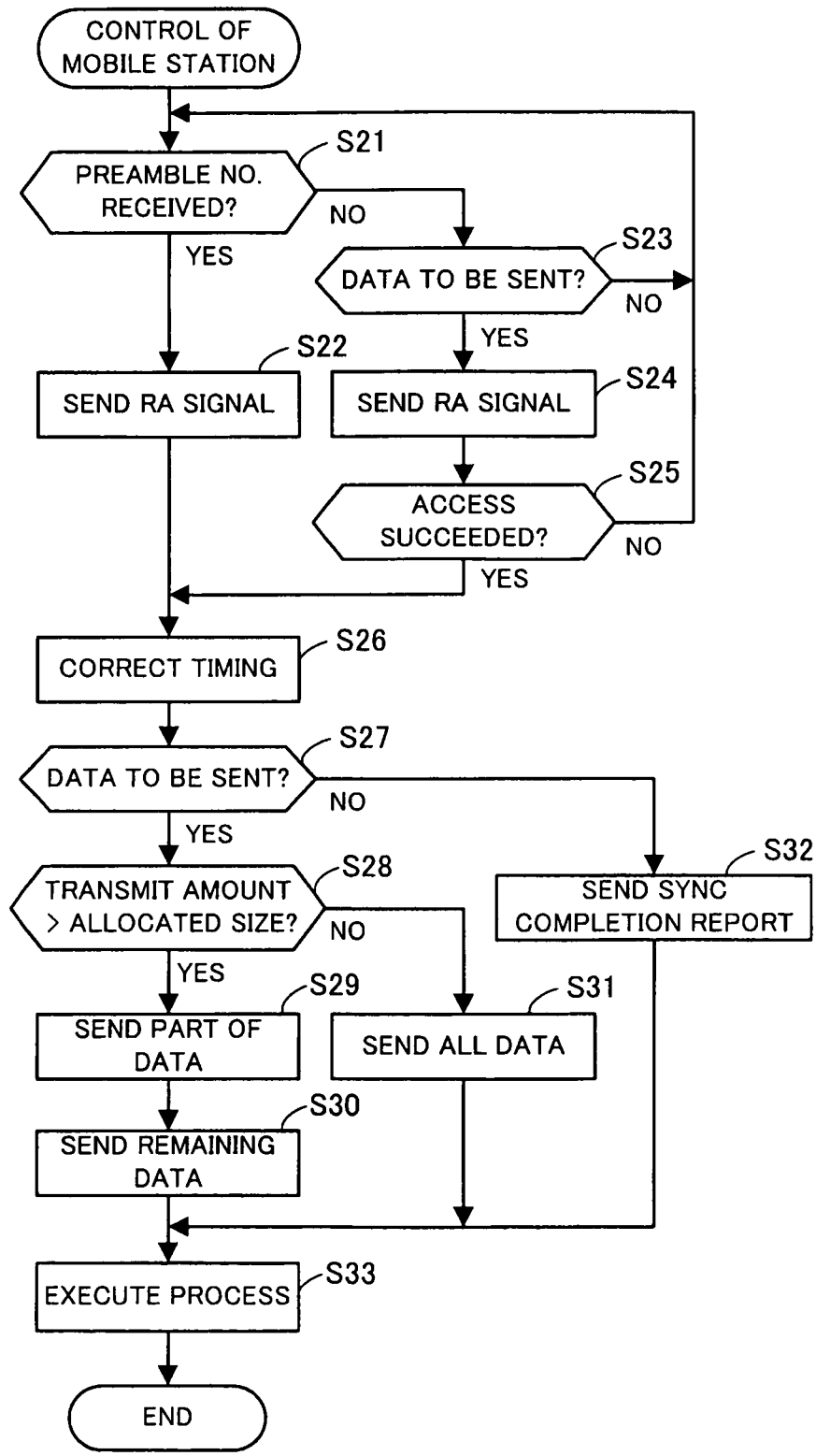
FIG. 11 is a flowchart illustrating a random access control process executed by the mobile station.

FIG. 11 illustrates a random access control process executed by the mobile station, wherein it is assumed that wireless communication is performed between the mobile station 200 and the radio base station 100. In the following, the process illustrated in FIG. 11 will be explained in order of step number.

Step S21: The preamble generator 252 determines whether or not a designated preamble number has been received from the radio base station 100. An individual preamble designation is received, for example, at the start of downlink data communication or at the time of handover. If a preamble number has been received, the process proceeds to Step S22; if not, the process proceeds to Step S23.

Step S22: The preamble generator 252 generates a preamble signal sequence individually designated by the radio base station 100. The transmitter 260 transmits the generated preamble signal to the radio base station 100 via the random access channel, whereupon the process proceeds to Step S26.

Step S23: The preamble generator 252 determines whether there is control data to be transmitted to the radio base station 100. The situation where control data has to be transmitted with no individual preamble designated occurs, for example, at the time of initial connection or reconnection with the radio base station 100 or at the start of uplink data transmission (when the arrival of user data at the transmission buffer 240 is detected by the control data generator 254). If there is control data to be transmitted, the process proceeds to Step S24; if not, the process proceeds to Step S21.

Step S24: The preamble generator 252 selects a preamble number available to the mobile station 200 by using random numbers. Then, the preamble generator 252 generates a preamble signal sequence corresponding to the selected number. The transmitter 260 transmits the generated preamble signal to the radio base station 100 via the random access channel.

Step S25: The preamble generator 252 determines whether or not the random access executed in Step S24 has succeeded. This determination can be made by determining whether a random access response has been received from the radio base station 100 within a predetermined time or not. If the random access meets with success, the process proceeds to Step S26. If the random access ends in failure, the process proceeds to Step S21.

Step S26: The timing corrector 251 corrects the uplink timing in accordance with the synchronization command included in the random access response received from the radio base station 100.

Step S27: The control data generator 254 determines whether there is control data to be transmitted to the radio base station 100. If there is control data to be transmitted, the process proceeds to Step S28; if not, the process proceeds to Step S32. The control data to be transmitted can be a BSR or an RRC message, for example. Also, there may exist multiple items of control data to be transmitted. Since the need to transmit control data may arise after Step S23 is executed, the decision in Step S27 may possibly differ from the decision in Step S23.

Step S28: Using the allocation information included in the random access response received from the radio base station 100, the control data generator 254 compares the amount of the control data to be transmitted with the size of the allocated uplink radio resource. If the transmit data amount is greater than the allocated size, the process proceeds to Step S29; if the transmit data amount is smaller than or equal to the allocated size, the process proceeds to Step S31.

Step S29: The control data generator 254 selects the control data to be transmitted first (e.g., a portion of the control data equal in amount to the difference between the allocated size and the amount of information indicative of a remaining data amount). Also, the control data generator 254 generates information indicating the remaining data amount and adds the generated information to the control data to be transmitted first. The transmitter 260 transmits the thus-prepared control data to the radio base station 100 via the allocated uplink data channel.

Step S30: The transmitter 260 transmits the remaining control data that was not selected in Step S29, to the radio base station 100 via the uplink data channel additionally allocated by the radio base station 100 after the execution of Step S29.

Step S31: The transmitter 260 transmits the control data to the radio base station 100 via the uplink data channel allocated by the radio base station 100.

Step S32: The control data generator 254 generates, as control data, a synchronization completion report indicating that correction of the uplink timing has been completed. The transmitter 260 transmits the generated synchronization completion report to the radio base station 100 via the uplink data channel allocated by the radio base station 100.

Step S33: The controller 250 executes a control process according to the cause of the occurrence of the random access. For example, where user data has been received from the radio base station 100, ACK/NACK is generated and transmitted via the uplink data or control channel. Also, where an uplink radio resource has been allocated after the transmission of a BSR, the user data held by the transmission buffer 240 is output. Further, where an RRC message has been sent, the controller 250 performs an initial connection or reconnection or the connection control for handover.

In this manner, the mobile station 200 transmits a preamble signal corresponding to the individual preamble designated by the radio base station 100 or corresponding to the preamble selected using random numbers, via the random access channel, and then receives a random access response including allocation information from the radio base station 100. Subsequently, the mobile station 200 transmits control data via the allocated uplink radio resource with a fixed size. If, at this time, there is no particular control data to be transmitted, the mobile station 200 sends a synchronization completion report. On the other hand, if a greater amount of control data than the allocated size needs to be transmitted, the mobile station 200 transmits part of the control data together with information indicating the remaining data amount so that an additional uplink radio resource may be allocated by the radio base station 100.

In the foregoing description, the synchronization completion report is sent when there is no other control data to be transmitted. Alternatively, also in the case where there is other control data to be transmitted, the synchronization completion report may be sent together with the control data.

Specific examples of communication flow between the radio base station 100 and the mobile station 200 will be now described.

Figure 12:
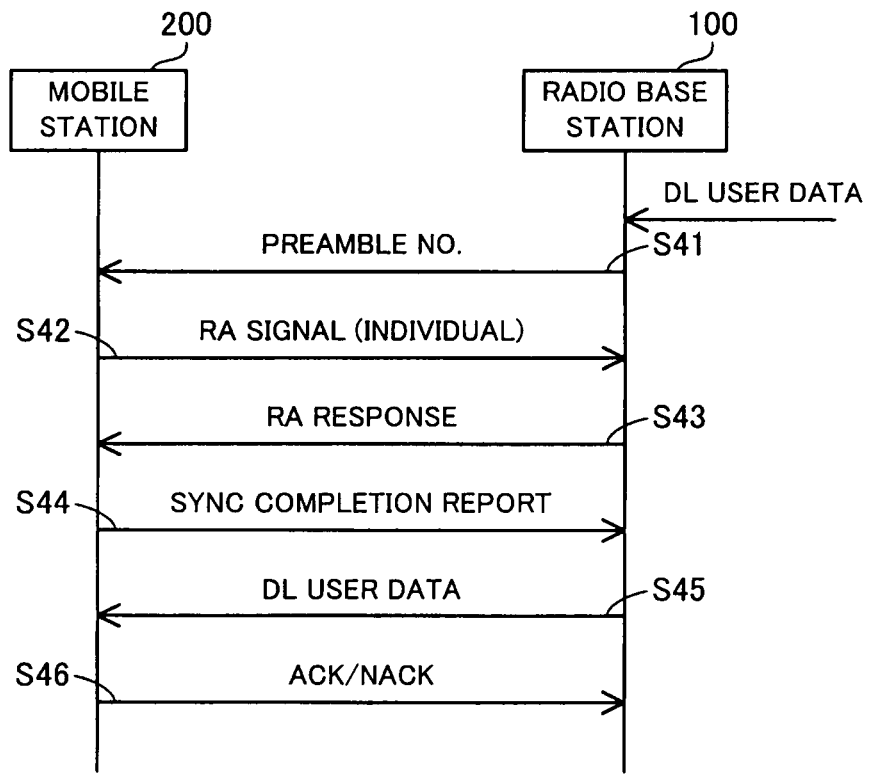
FIG. 12 is a sequence diagram illustrating downlink data communication.

FIG. 12 is a sequence diagram illustrating downlink data communication. In the following, the process illustrated in FIG. 12 will be explained in order of step number.

Step S41: On arrival of user data to be transmitted to the mobile station 200, the radio base station 100 allocates an individual preamble number to the mobile station 200. Then, the radio base station 100 transmits the preamble number to the mobile station 200 via the downlink data channel.

Step S42: The mobile station 200 transmits a preamble signal corresponding to the preamble number designated in Step S41, to the radio base station 100 via the random access channel. The allocation of an individual preamble remains valid only for a predetermined time. Accordingly, the mobile station 200 sends a random access signal within the predetermined time after the notification of the preamble number.

Step S43: The radio base station 100 measures the uplink communication timing on the basis of the random access signal (preamble signal) received from the mobile station 200. Also, the radio base station 100 allocates an uplink radio resource (uplink data channel) with the predetermined size to the mobile station 200. Subsequently, the radio base station 100 transmits a random access response including a synchronization command and allocation information to the mobile station B200 via the downlink data channel.

Step S44: The mobile station 200 corrects the uplink timing in accordance with the synchronization command included in the random access response. Then, the mobile station 200 transmits a synchronization completion report to the radio base station 100 via the uplink data channel specified by the allocation information included in the random access response.

Step S45: On receiving the synchronization completion report from the mobile station 200, the radio base station 100 transmits user data destined for the mobile station 200, to the mobile station 200 via the downlink data channel.

Step S46: The mobile station 200 transmits ACK or NACK, depending on the condition of reception of the downlink data channel from the radio base station 100, to the radio base station 100 via the uplink data or control channel.

In this manner, where only the downlink data communication from the radio base station 100 to the mobile station 200 is performed, the mobile station 200 transmits the synchronization completion report by using the uplink radio resource allocated by means of the random access response. On receiving the synchronization completion report from the mobile station 200, the radio base station 100 starts the downlink data transmission.

Figure 13:
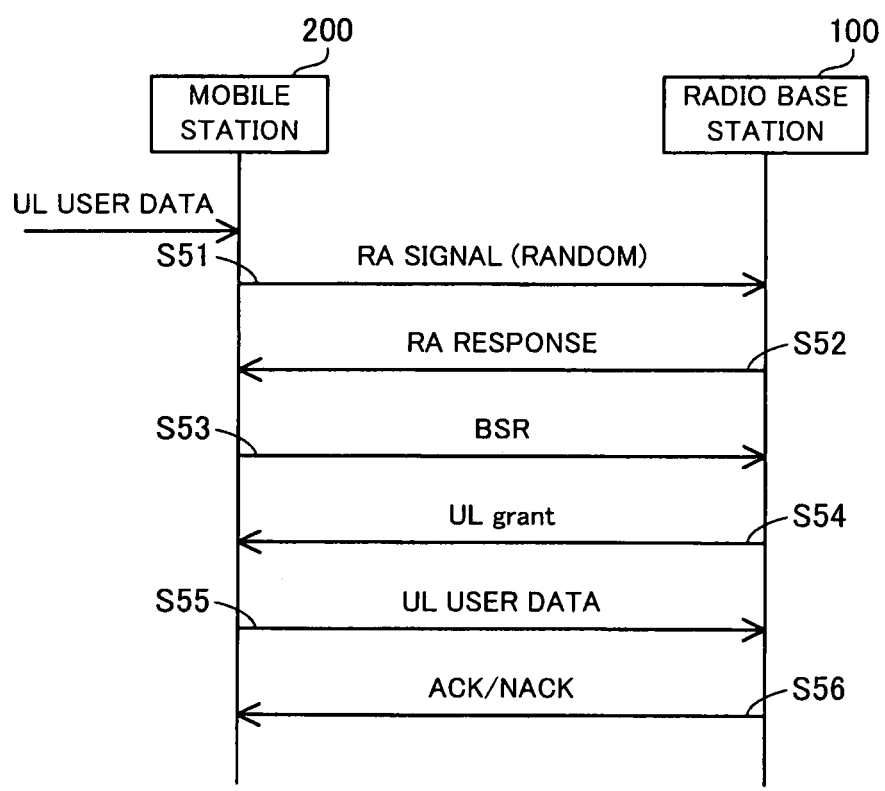
FIG. 13 is a sequence diagram illustrating uplink data communication.

FIG. 13 is a sequence diagram illustrating uplink data communication. In the following, the process illustrated in FIG. 13 will be explained in order of step number.

Step S51: On arrival of user data to be transmitted to the radio base station 100, the mobile station 200 selects a preamble number at random. Then, the mobile station 200 transmits a preamble signal corresponding to the selected preamble number, to the radio base station 100 via the random access channel. Such a non-individual preamble is also available to other mobile stations such as the mobile station 200a, and therefore, there is the possibility of collision being caused. If the transmission fails because of the collision, the mobile station 200 repeatedly transmits the preamble signal until the transmission meets with success.

Step S52: The radio base station 100 measures the uplink communication timing on the basis of the random access signal (preamble signal) received from the mobile station 200. Also, the radio base station 100 allocates an uplink radio resource (uplink data channel) with the predetermined size to the mobile station 200. Subsequently, the radio base station 100 transmits a random access response including a synchronization command and allocation information to the mobile station 200 via the downlink data channel.

Step S53: The mobile station 200 corrects the uplink timing in accordance with the synchronization command included in the random access response. Then, the mobile station 200 transmits a BSR (data send request including information about the data amount) to the radio base station 100 via the uplink data channel specified by the allocation information included in the random access response.

Step S54: The radio base station 100 allocates the mobile station 200 an uplink radio resource (uplink data channel) matching the data amount indicated by the BSR received from the mobile station 200. Subsequently, the radio base station 100 transmits allocation information to the mobile station 200 via the downlink control channel.

Step S55: The mobile station 200 transmits the user data to the radio base station 100 via the uplink data channel specified by the allocation information received from the radio base station 100.

Step S56: The radio base station 100 transmits ACK or NACK, depending on the condition of reception of the uplink data channel from the mobile station 200, to the mobile station 200 via the downlink data channel.

In this manner, where only the uplink data communication from the mobile station 200 to the radio base station 100 is performed, the mobile station 200 transmits a BSR by using the uplink radio resource allocated by means of the random access response. On receiving the BSR from the mobile station 200, the radio base station 100 allocates the mobile station 200 an uplink radio resource with a size matching the BSR. After this, the mobile station 200 starts the uplink data transmission.

Figure 14:
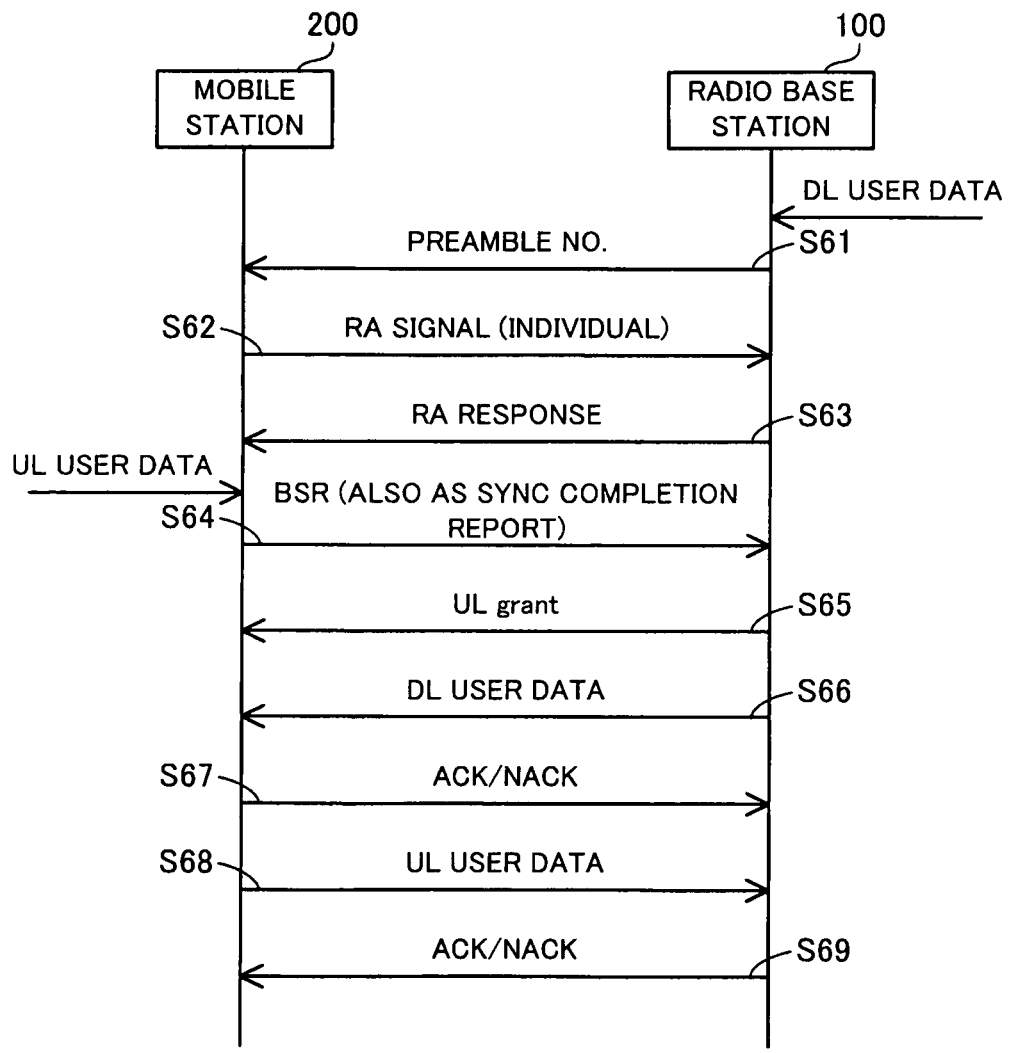
FIG. 14 is a first sequence diagram illustrating uplink and downlink data communications.

FIG. 14 is a first sequence diagram illustrating uplink and downlink data communications. In the following, the process illustrated in FIG. 14 will be explained in order of step number.

Step S61: On arrival of user data to be transmitted to the mobile station 200, the radio base station 100 allocates an individual preamble number to the mobile station 200. Then, the radio base station 100 transmits the preamble number to the mobile station 200 via the downlink data channel.

Step S62: The mobile station 200 transmits a preamble signal corresponding to the preamble number designated in Step S61, to the radio base station 100 via the random access channel.

Step S63: The radio base station 100 measures the uplink communication timing on the basis of the random access signal (preamble signal) received from the mobile station 200. Also, the radio base station 100 allocates an uplink radio resource (uplink data channel) with the predetermined size to the mobile station 200. Then, the radio base station 100 transmits a random access response including a synchronization command and allocation information to the mobile station 200 via the downlink data channel.

Step S64: The mobile station 200 corrects the uplink timing in accordance with the synchronization command included in the random access response. At this time, the mobile station 200 recognizes that user data to be transmitted to the radio base station 100 has arrived, and transmits a BSR to the radio base station 100 via the uplink data channel specified by the allocation information included in the random access response. The BSR serves also as the synchronization completion report.

Step S65: The radio base station 100 allocates the mobile station 200 an uplink radio resource (uplink data channel) matching the data amount indicated by the BSR received from the mobile station 200. Then, the radio base station 100 transmits allocation information to the mobile station 200 via the downlink control channel.

Step S66: After receiving the BSR from the mobile station 200, the radio base station 100 transmits the user data destined for the mobile station 200, to the mobile station 200 via the downlink data channel. Namely, on receiving the BSR, the radio base station 100 judges that correction of the uplink timing has been completed.

Step S67: The mobile station 200 transmits ACK or NACK, depending on the condition of reception of the downlink data channel from the radio base station 100, to the radio base station 100 via the uplink data or control channel.

Step S68: The mobile station 200 transmits the user data to the radio base station 100 via the uplink data channel specified by the allocation information received in Step S65.

Step S69: The radio base station 100 transmits ACK or NACK, depending on the condition of reception of the uplink data channel from the mobile station 200, to the mobile station 200 via the downlink data channel.

In this manner, where uplink data communication from the mobile station 200 to the radio base station 100 is also performed after the start of downlink data communication from the radio base station 100 to the mobile station 200, the mobile station 200 transmits a BSR by using the uplink radio resource allocated by means of the random access response that was generated for the downlink data communication. On receiving the BSR from the mobile station 200, the radio base station 100 allocates the mobile station 200 an uplink radio resource with a size matching the BSR. Consequently, the radio base station 100 can initiate the downlink data transmission, and also the mobile station 200 can initiate the uplink data transmission.

The messages relating to the uplink and downlink data communications can be sent/received independently of each other, and therefore, Step S65 and the following steps may possibly be executed in different order. For example, the radio base station 100 may start to transmit the downlink user data after receiving the uplink user data, or may allocate the resource for the reception of the uplink user data after the transmission of the downlink user data is completed.

Also, the mobile station 200 may transmit the ACK/NACK (Step S67) together with the user data (Step S68) via the same uplink data channel. Further, in the above example, the BSR is transmitted (transmission of the uplink user data is started) by using the uplink radio resource allocated for starting the downlink data communication. Alternatively, an RRC message may be transmitted in place of or together with the BSR.

Figure 15:
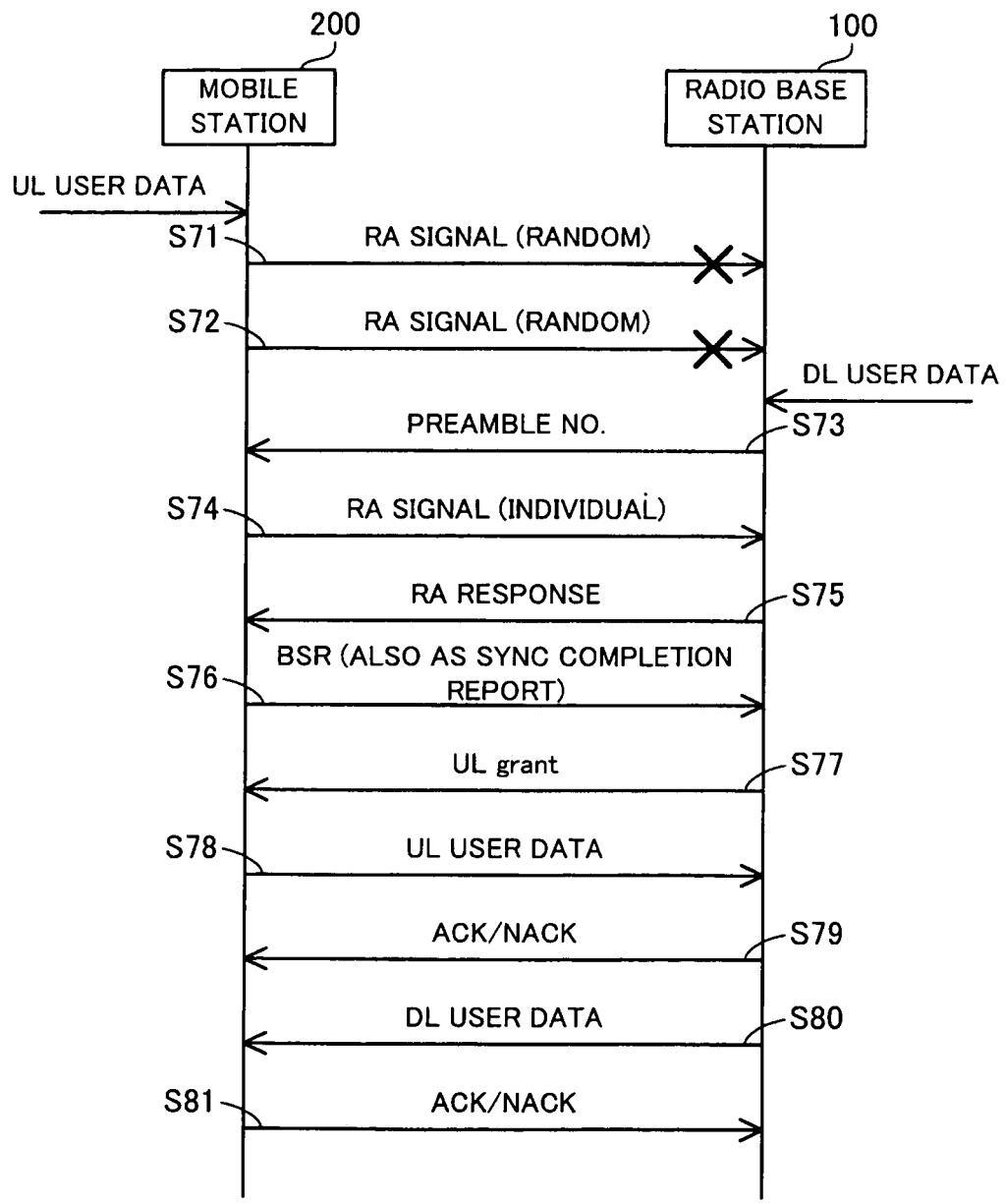
FIG. 15 is a second sequence diagram illustrating uplink and downlink data communications.

FIG. 15 is a second sequence diagram illustrating uplink and downlink data communications. In the following, the process illustrated in FIG. 15 will be explained in order of step number.

Step S71: On arrival of user data to be transmitted to the radio base station 100, the mobile station 200 selects a preamble number at random. Then, the mobile station 200 transmits a preamble signal corresponding to the selected preamble number to the radio base station 100 via the random access channel.

Step S72: On detecting failure of the transmission of the random access signal in Step S71 due to collision with other mobile stations such as the mobile station 200a, the mobile station 200 again transmits the preamble signal corresponding to the preamble number selected in Step S71. In this case, in order to lessen the probability of collision occurring again, the mobile station 200 retransmits the preamble signal after an interval of a suitable time from the previous transmission. Where the transmission interval has been designated by the radio base station 100, the mobile station 200 retransmits the preamble signal after the designated interval.

Step S73: On arrival of user data to be transmitted to the mobile station 200, the radio base station 100 allocates an individual preamble number to the mobile station 200. Then, the radio base station 100 transmits the preamble number to the mobile station 200 via the downlink data channel.

Step S74: If the random access still does not meet with success since the execution of Step S72, the mobile station 200 changes the preamble number from the one selected in Step S71 to the one designated in Step S73, and transmits a preamble signal corresponding to the latter preamble number to the radio base station 100.

Step S75: The radio base station 100 measures the uplink communication timing on the basis of the random access signal (preamble signal) received from the mobile station 200. Also, the radio base station allocates an uplink radio resource (uplink data channel) with the predetermined size to the mobile station 200. Subsequently, the radio base station 100 transmits a random access response including a synchronization command and allocation information to the mobile station 200 via the downlink data channel.

Step S76: The mobile station 200 corrects the uplink timing in accordance with the synchronization command included in the random access response. Then, the mobile station 200 transmits a BSR to the radio base station 100 via the uplink data channel specified by the allocation information included in the random access response. The BSR serves also as the synchronization completion report.

Step S77: The radio base station 100 allocates the mobile station 200 an uplink radio resource (uplink data channel) matching the data amount indicated by the BSR received from the mobile station 200. Then, the radio base station 100 transmits allocation information to the mobile station 200 via the downlink control channel.

Step S78: The mobile station 200 transmits the user data to the radio base station 100 via the uplink data channel specified by the allocation information received from the radio base station 100.

Step S79: The radio base station 100 transmits ACK or NACK, depending on the condition of reception of the uplink data channel from the mobile station 200, to the mobile station 200 via the downlink data channel.

Step S80: The radio base station 100 transmits the user data destined for the mobile station 200, to the mobile station 200 via the downlink data channel.

Step S81: The mobile station 200 transmits ACK or NACK, depending on the condition of reception of the downlink data channel from the radio base station 100, to the radio base station 100 via the uplink data or control channel.

In this manner, if an individual preamble is designated by the radio base station 100 while the random access from the mobile station 200 to the radio base station 100 repeatedly ends in failure, the mobile station 200 changes the transmit preamble signal to the designated one. Then, the mobile station 200 transmits a BSR by using the allocated uplink radio resource. Consequently, the radio base station 100 can start the downlink data transmission and the mobile station 200 can start the uplink data transmission.

The messages relating to the uplink and downlink data communications can be sent/received independently of each other, and therefore, Step S77 and the succeeding steps may possibly be executed in different order. For example, the radio base station 100 may allocate the resource for the reception of the uplink user data after the transmission of the downlink user data is completed. Also, in the above example, the BSR is transmitted (transmission of the uplink user data is started) by using the uplink radio resource. Alternatively, an RRC message may be transmitted in lieu of or together with the BSR.

Further, the transmission of the random access signal in Step S74 may be executed at timing coinciding with the interval of signal transmission in Steps S71 and S72 (e.g., the transmission interval designated by the radio base station 100) or at timing independent of the interval of signal transmission in Steps S71 and S72. Also, in Step S72, the preamble of the preamble number selected first is used, but the preamble number may be selected anew at random.

Figure 16:
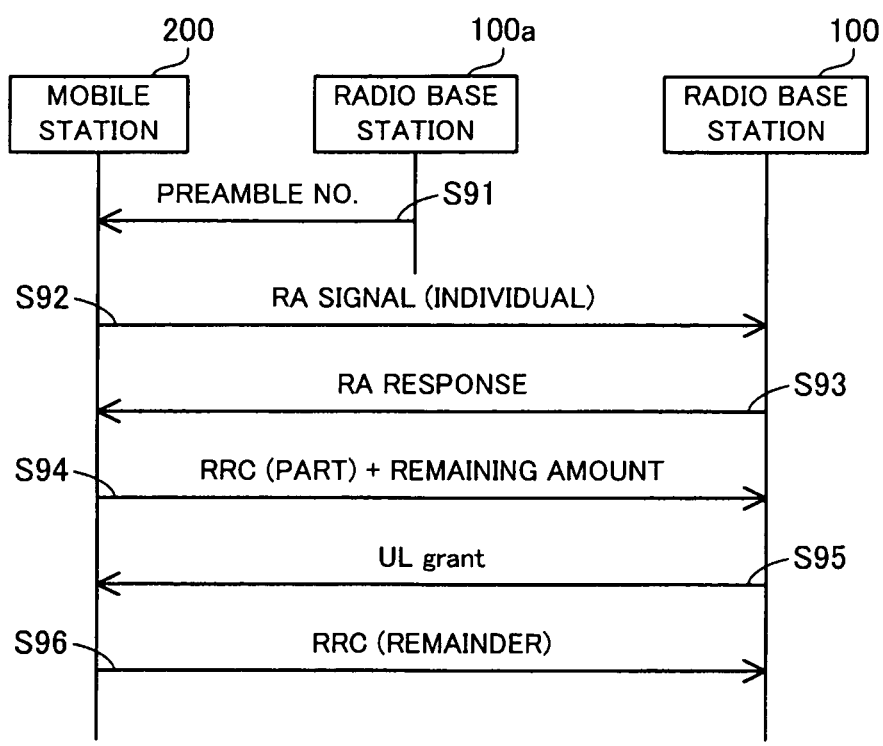
FIG. 16 is a sequence diagram illustrating a handover process.

FIG. 16 is a sequence diagram illustrating a handover process, wherein it is assumed that the mobile station 200 is handed from the radio base station 100a over to the radio base station 100. In the following, the process illustrated in FIG. 16 will be explained in order of step number.

Step S91: On judging that a handover to the radio base station 100 is required, the radio base station 100a transmits a preamble number to the mobile station 200 via the downlink data channel. This preamble number is allocated, for example, by the radio base station 100 for the mobile station 200 on receipt of a handover start notification from the radio base station 100a.

Step S92: The mobile station 200 transmits a preamble signal corresponding to the preamble number designated in Step S91, to the radio base station 100 via the random access channel.

Step S93: The radio base station 100 measures the uplink communication timing on the basis of the random access signal (preamble signal) received from the mobile station 200. Also, the radio base station 100 allocates an uplink radio resource (uplink data channel) with the predetermined size to the mobile station 200. Then, the radio base station 100 transmits a random access response including a synchronization command and allocation information to the mobile station 200 via the downlink data channel.

Step S94: The mobile station 200 corrects the uplink timing in accordance with the synchronization command included in the random access response. At this time, the mobile station 200 recognizes that the data amount of an RRC message to be sent is greater than the allocated size, and therefore, the mobile station 200 transmits part of the RRC message and information indicative of the remaining data amount to the radio base station 100 via the allocated uplink data channel.

Step S95: The radio base station 100 allocates the mobile station 200 an uplink radio resource (uplink data channel) according to the remaining data amount-indicative information received from the mobile station 200. Then, the radio base station 100 transmits allocation information to the mobile station 200 via the downlink control channel.

Step S96: The mobile station 200 transmits the remainder of the RRC message to the radio base station 100 via the uplink data channel specified by the allocation information received from the radio base station 100.

Thus, in the case of a handover from the radio base station 100a to the radio base station 100, the mobile station 200 transmits a preamble signal corresponding to the preamble number received from the radio base station 100a, which is the source of the handover, to the radio base station 100, which is the destination of the handover. Subsequently, the mobile station 200 transmits an RRC message to the radio base station 100.

In this case, the mobile station 200 first transmits part of the RRC message and information indicative of the remaining data amount via the uplink radio resource allocated by means of the random access response, and then transmits the remainder of the RRC message via the uplink radio resource additionally allocated thereafter. Thus, it is possible to smoothly transmit, to the radio base station 100, control data with a large data amount (e.g., control data greater in amount than the BSR), such as an RRC message sent at the time of handover.

In the wireless communication system described above, the mobile station 200, 200a is allocated an uplink radio resource also by means of a random access response generated for the purpose of timing synchronization at the time of downlink data communication. Accordingly, if control data to be transmitted is generated thereafter, the mobile station 200, 200a can use the uplink radio resource allocated by means of the random access response and need not make a separate random access. Since the radio resource is allocated using an individual preamble in particular, it is possible to avoid collision of accesses, which can occur when the radio resource is allocated using a preamble selected by means of random numbers.

Also, the radio base station 100, 100a can reliably detect completion of the synchronization of the uplink timing at an early stage by receiving some control data (synchronization completion report or some other type of control data transmitted in lieu of the synchronization completion report) from the mobile station 200, 200a after a random access response is transmitted. This permits the subsequent communication (e.g., downlink data transmission) to be started at earlier timing.

Further, the radio base station 100, 100a allocates a fixed size of uplink radio resource that is independent of the cause of the occurrence of the random access, whereby the random access processing load can be mitigated. In this case, the mobile station 200, 200a can add information indicative of the remaining data amount so that an additional uplink radio resource may be allocated. Thus, even if the size of the radio resource allocated at the time of random access is fixed to a size equivalent to the data amount of the BSR or thereabout, for example, it is possible to smoothly transmit an RRC message at the time of handover, which message is likely to hold a larger amount of data than the BSR on such occasions.

The random access control described above can be applied to wireless communication systems with system configurations different from that illustrated in FIG. 2. Also, the aforementioned random access control is applicable to wireless communication systems employing different multiplex communication schemes, different multiple access schemes and different channel configurations from the one illustrated in FIGS. 5 to 7.

Moreover, in the wireless communication system described above, an uplink radio resource having a fixed size independent of the cause of the occurrence of a random access is allocated, but the size to be allocated need not always be the same. For example, uplink radio resources with different sizes may be allocated depending on whether the preamble signal has been generated based on an individually allocated preamble or a non-individual preamble selected at random. Also, in the aforementioned wireless communication system, various control data is transmitted via the uplink radio resource designated by the random access response, but uplink user data, together with the control data, may be transmitted via the designated uplink radio resource.

The radio base station, the mobile station and the communication method, all described above, make it possible to improve the efficiency of the random access processing.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A radio base station comprising:
a transmitter configured to designate, with respect to a mobile station, a random access preamble when the radio base station has downlink user data to be transmitted to the mobile station; and
a receiver configured to receive the designated random access preamble from the mobile station,
wherein the transmitter transmits, to the mobile station, timing adjustment information prepared based on a result of reception of the random access preamble, and allocation information about an uplink radio resource allocated to the mobile station,
when the mobile station does not have control data to be transmitted, the receiver receives a synchronization completion report from the mobile station by using the uplink radio resource specified by the allocation information, and
when the mobile station has the control data, the synchronization completion report is omitted and the receiver receives the control data from the mobile station by using the uplink radio resource specified by the allocation information.

2. The radio base station according to claim 1, wherein, when a handover is to be performed, the transmitter transmits, to the mobile station, the allocation information allocating an uplink radio resource with a size identical with that allocated when the radio base station has the downlink user data.

3. The radio base station according to claim 1, wherein, when a reconnection is requested from the mobile station, the transmitter transmits, to the mobile station, the allocation information allocating an uplink radio resource with a size identical with that allocated when the radio base station has the downlink user data.

4. The radio base station according to claim 1, wherein the transmitter allocates, by means of the allocation information, an uplink radio resource of an invariably fixed size to the mobile station in response to reception of the designated random access preamble.

5. The radio base station according to claim 1, wherein the receiver receives, as the control data, a data send request from the mobile station, and the transmitter transmits, to the mobile station, other allocation information allocating another uplink radio resource matching the data send request received by the receiver.

6. The radio base station according to claim 1, wherein the receiver receives the control data including information indicative of a remaining data amount, and the transmitter transmits, to the mobile station, other allocation information allocating another uplink radio resource matching the remaining data amount indicated by the information received by the receiver.

7. A mobile station comprising:

a receiver configured to receive designation of a random access preamble from a radio base station when the radio base station has downlink user data to be transmitted to the mobile station; and a transmitter configured to transmit the designated random access preamble to the radio base station, wherein the receiver receives, from the radio base station, timing adjustment information prepared by the radio base station in accordance with a result of reception of the random access preamble, and allocation information about an uplink radio resource allocated to the mobile station, the transmitter transmits, when the mobile station does not have control data to be transmitted, a synchronization completion report to the radio base station by using the uplink radio resource specified by the allocation information, and the transmitter omits, when the mobile station has the control data, to transmit the synchronization completion report and transmits the control data to the radio base station by using the uplink radio resource specified by the allocation information.

8. The mobile station according to claim 7, wherein the transmitter transmits a data send request as the control data.

9. The mobile station according to claim 7, wherein the transmitter transmits multiple types of control data by using the uplink radio resource specified by the allocation information.

10. The mobile station according to claim 7, wherein, when an allocated size of the uplink radio resource specified by the allocation information is smaller than an amount of control data to be transmitted, the transmitter includes, in transmit data, information indicative of a remaining data amount.

11. The mobile station according to claim 10, wherein the transmitter includes, in the control data, header information showing that the information indicative of the remaining data amount is included.

12. A communication method comprising:

designating, with respect to a mobile station, a random access signal when transmitting downlink data to the mobile station;

transmitting the designated random access signal to the radio base station from the mobile station;

transmitting, to the mobile station, timing adjustment information prepared based on a result of reception of the random access signal, and allocation information about an uplink radio resource allocated to the mobile station;

transmitting, when the mobile station does not have control data to be transmitted, a synchronization completion report to the radio base station by using the uplink radio resource specified by the allocation information; and omitting, when the mobile station has the control data, to transmit the synchronization completion report and transmitting the control data to the radio base station by using the uplink radio resource specified by the allocation information.

13. A communication method comprising:

transmitting, to a radio base station, a non-individual random access signal not designated by the radio base station when transmitting uplink data to the radio base station;

designating, with respect to the mobile station, an individual random access signal when transmitting downlink data to the mobile station;

when transmission of the non-individual random access signal ends in failure, transmitting the individual random access signal, in place of the non-individual random access signal, to the radio base station;

transmitting, to the mobile station, timing adjustment information prepared based on a result of reception of the individual random access signal, and allocation information about an uplink radio resource allocated to the mobile station;

transmitting, when the mobile station does not have control data to be transmitted, a synchronization completion report to the radio base station by using the uplink radio resource specified by the allocation information; and omitting, when the mobile station has the control data, to transmit the synchronization completion report and transmitting the control data to the radio base station by using the uplink radio resource specified by the allocation information.

14. The communication method according to claim 13, comprises transmitting a data send request by using the uplink radio resource specified by the allocation information received from the radio base station.

* * * * *